United States Patent [19]

Bourne

[11] Patent Number: 4,782,889
[45] Date of Patent: Nov. 8, 1988

[54] LOW MASS HYDRONIC RADIANT FLOOR SYSTEM

[76] Inventor: Richard C. Bourne, 123 C St., Davis, Calif. 95616

[21] Appl. No.: 859,491

[22] Filed: May 5, 1986

[51] Int. Cl.⁴ .......................... F24H 9/08; F24D 3/00
[52] U.S. Cl. ........................................ 165/56; 165/49; 237/69
[58] Field of Search .................... 165/49, 56, 11.1; 237/69

[56] References Cited

U.S. PATENT DOCUMENTS

| | | | |
|---|---|---|---|
| 2,536,258 | 1/1951 | Bovard | 237/69 |
| 2,548,036 | 4/1951 | Milborn | 165/56 |
| 2,598,279 | 5/1952 | McKibbin | 165/56 |
| 2,783,639 | 3/1957 | Werner | 237/69 |
| 3,053,509 | 9/1962 | Haupt et al. | 237/69 |
| 3,084,480 | 4/1963 | Fork . | |
| 3,101,097 | 8/1963 | Murray . | |
| 3,131,512 | 5/1964 | MacLeod, Jr. . | |
| 3,237,356 | 3/1966 | Fork . | |
| 3,262,238 | 7/1966 | Fork . | |
| 3,334,457 | 8/1967 | Hudson et al. . | |
| 3,368,311 | 2/1968 | Fork . | |
| 3,420,018 | 1/1969 | Fork . | |
| 3,426,492 | 2/1969 | Fork . | |
| 3,426,802 | 2/1969 | Fork . | |
| 3,435,568 | 4/1969 | Hoseason et al. . | |
| 3,453,791 | 7/1969 | Fork . | |
| 3,494,084 | 2/1970 | Hazen . | |
| 3,494,651 | 2/1970 | Fork et al. . | |
| 3,566,566 | 3/1971 | Janic . | |
| 3,721,051 | 3/1973 | Fork . | |
| 4,369,836 | 1/1983 | Bleckmann | 165/49 |
| 4,508,162 | 4/1985 | Radtke | 165/56 |

FOREIGN PATENT DOCUMENTS

| | | |
|---|---|---|
| 659866 | 3/1963 | Canada . |
| 676751 | 12/1963 | Canada . |
| 0022646 | 1/1981 | European Pat. Off. ............... 165/56 |
| 0029818 | 6/1981 | European Pat. Off. ............... 165/49 |
| 0133631 | 3/1985 | European Pat. Off. ............... 165/56 |
| 2850669 | 5/1979 | Fed. Rep. of Germany ........ 165/49 |
| 0009951 | 1/1977 | Japan ..................................... 165/49 |
| 0070330 | 4/1982 | Japan . |
| 8201058 | 4/1982 | PCT Int'l Appl. .................... 165/56 |
| 587457 | 4/1977 | Switzerland . |

OTHER PUBLICATIONS

Wirsbo Under Floor Heating Installation Manual, Wirsbo Bruks Aktiebolag, Sweden, (no date).
H. H. Robertson Co. vs Barger Metal Fabricating Co., 225 USPQ 1191-1211, Decided Nov. 20, 1984.

Primary Examiner—Albert W. Davis, Jr.
Assistant Examiner—John K. Ford
Attorney, Agent, or Firm—Parkhurst, Oliff & Berridge

[57] ABSTRACT

A low mass hydronic radiant floor heating system for heating a room by circulating a liquid includes a metal deck having a plurality of regularly spaced troughs to provide structural strength. The deck is adapted to be secured directly to a plurality of floor joists. Tubing is placed in the troughs to distribute heat by circulating warm liquid through the tubing. The troughs of the metal deck support structural floor loads while providing a housing for the tubing. Flat portions of the deck between the troughs distribute heat laterally.

12 Claims, 6 Drawing Sheets

SAMPLE HOUSE FLOOR PLAN

SAMPLE HOUSE ZONING USING LMHRF

LOW MASS HYDRONIC RADIANT FLOOR SYSTEM

BACKGROUND OF THE INVENTION

The present invention relates to hydronic radiant floor systems (HRF), and more specifically, to low mass hydronic radiant floor systems (LMHRF) for heating a room by circulating fluid.

Conventionally, a hydronic radiant floor system may be constructed in "slab-on-grade" buildings in which a metallic or plastic tubing, such as polybutylene (PB) tubing, is used to distribute heat. The tubing is typically secured to a steel reinforcement prior to pouring concrete. With a raised wood floor construction, however, HRF heating is presently at a cost disadvantage because a concrete topping must be poured in the spaces surrounding the tubing. The concrete topping causes added cost and structural loads, and increases "time lag" in system control.

Various methods and apparatus for the construction of floors for heating a room are well known in the art. For example, British Pat. No. 871,439 discloses a method of forming floors for the reception of space heating apparatus of the type in which heating elements are located in troughs, ducts or the like within the floor. U.S. Pat. No. 4,212,348 discloses a heat-radiating floor board having a stratified structure which comprises a metallic surface plate, a depressed metallic tube for hot water circulation located under the plate, a heat insulating material and a base board. Japanese Pat. No. 57-70330 discloses a floor heating panel in which heating pipes are assembled in a floor panel.

BRIEF SUMMARY OF THE INVENTION

It is an object of the present invention to provide a low mass hydronic radiant floor (LMHRF) system wherein the need for pouring concrete in areas surrounding the heat distributing tubing is eliminated.

It is another object of the present invention to overcome the disadvantages associated with a conventional hydronic radiant floor system.

It is another object of the present invention to provide a low mass hydronic radiant floor system which is cost-competitive with forced air systems for wood frame floor applications and facilitates rapid construction.

It is another object of the present invention to provide an hydronic radiant floor system which exhibits several advantages, i.e., improved heating, reduced energy consumption, elimination of blower noises, and reduced drafts.

It is another object of the present invention to provide a low mass hydronic radiant floor system in which a single metal deck component fulfills the functions of (1) distributing structural loads to the floor joists, (2) securely holding the hydronic tubing, and (3) conveying heat laterally from the tubes to generate a relatively uniform floor surface temperature.

It is another object of the present invention to provide a LMHRF system which permits less expensive repairs if tubes are damaged, compared with tradiational systems having tubing embedded in concrete.

The above-mentioned objects are obtained by providing the low mass hydronic radiant floor system of the present invention which comprises a metal deck having a plurality of regularly spaced troughs to provide strength for supporting structural loads. The deck is adapted to be secured directly to a plurality of floor joists. Hydronic tubing is snapped into the troughs to distribute heat and is shaped to form U-bends or converge with manifolds in intermediate and perimeter cavities.

The troughs in the metal deck provide a space and holding mechanism for the hydronic tubing as well as structural support to span across the joists. Flat portions of the deck spanning between the troughs transfer heat laterally from the tubes held in the troughs. Any flooring material such as a thin fiberboard top surface, an in-situ wet topping, or finished flooring can be placed over the deck.

BRIEF DESCRIPTION OF THE DRAWINGS

Other objects, features and advantages of the present invention will become more apparent from the following detailed description of the various embodiments, the appended claims, and the accompanying drawings, in which:

DETAILED DESCRIPTION OF THE INVENTION

Figure 1:
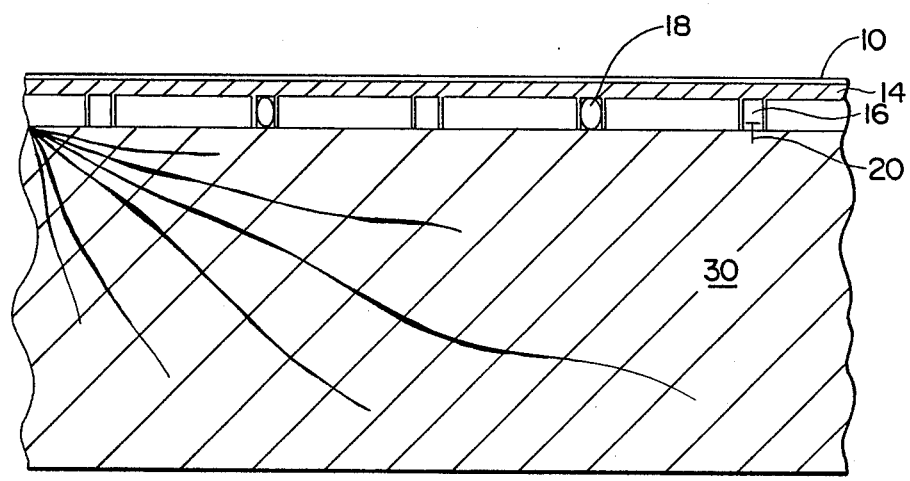
FIG. 1 is a partially schematic cross-sectional view, transverse to the tubing, of a floor construction according to the present invention.

As shown in FIG. 1, a low mass hydronic radiant floor system (LMHRF) according to the invention comprises a metal deck 14 secured directly to a plurality of floor joists 30 and 32 by nails 20. Due to its high thermal conductivity, the metal deck augments heat distribution while supporting structural loads. In one embodiment, a thin topping layer 10 made of fiber board or a formed-in-situ topping entirely covers the deck 14. Alternatively, finished flooring may be placed directly on the metal deck. The topping layer 10 and floor joists 30 and 32 may be made of other conventional materials generally used by those skilled in the construction arts.

Figure 2:
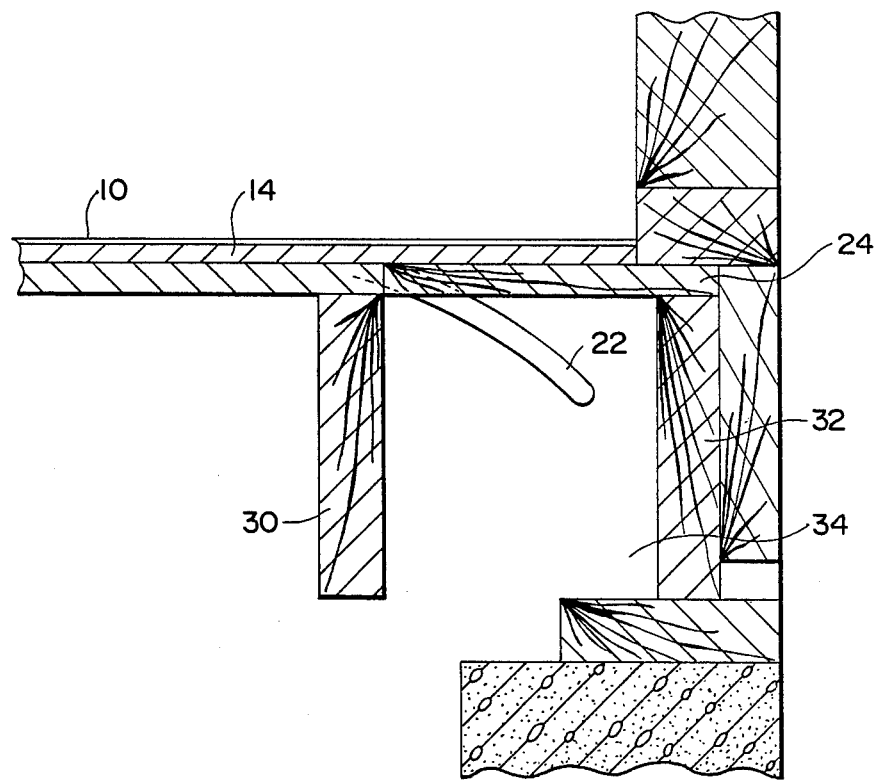
FIG. 2 is a partially schematic cross-sectional view, parallel to the tubing, of the floor construction according to the present invention showing a perimeter joist, a floor foundation and a vertical wall.

As seen in FIG. 1, the deck 14 (made of metal, to maximize lateral heat transfer and provide structural support) is formed such that it has a plurality of troughs 16 at regular intervals to provide structural strength, and cavities to receive and hold a tubing 18 which distributes heat by circulating a fluid therethrough. The tubing 18 is typically made of plastic such as polybutylene or other resilient material, although metal or any suitable material may be used, and has a diameter slightly more than the width of the troughs to ensure secure holding of the tubing. That is, the size or diameter of the tubing is slightly greater than the width of the troughs 18 so that the tubes are snapped-in and securely held within the troughs. While the tubing 18 is typically of a round cross-sectional configuration, it may also have a square or other orthogonal cross-sectional configuration to increase tube/deck contact. The deck 14 may be secured to the floor joists 30 and 32 by fasteners, such as nails 20 through troughs 16. A stripe pattern corresponding to the location of the tube may be provided on the topping layer as a warning against driving the fasteners or nails into the tube. As shown in FIG. 2, the troughs 16 run perpendicular to the floor joists 30 and 32.

Figure 3:
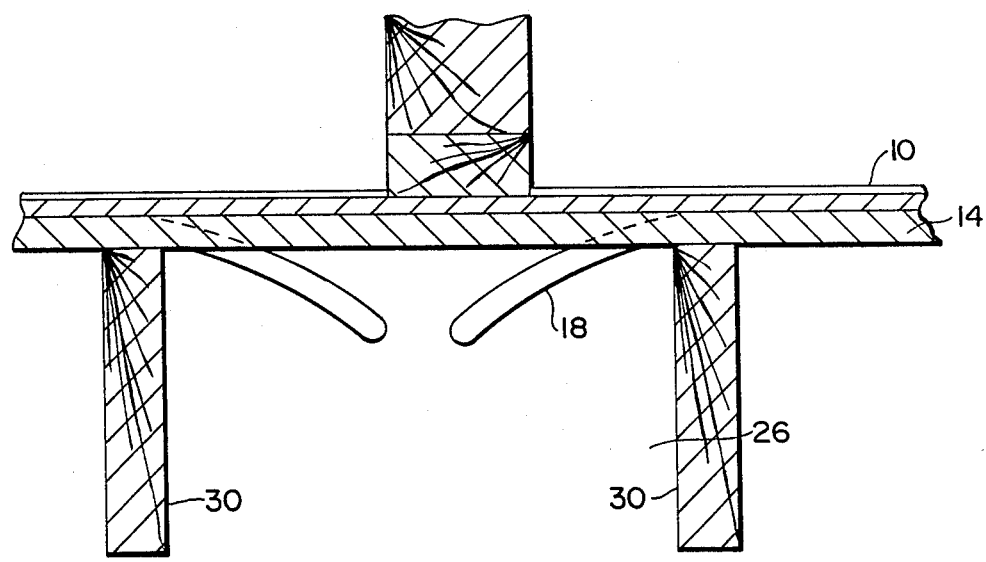
FIG. 3 is a partially schematic cross-sectional view, parallel to the tubing, of the floor construction according to the present invention, also showing a zone joint.
Figure 4:
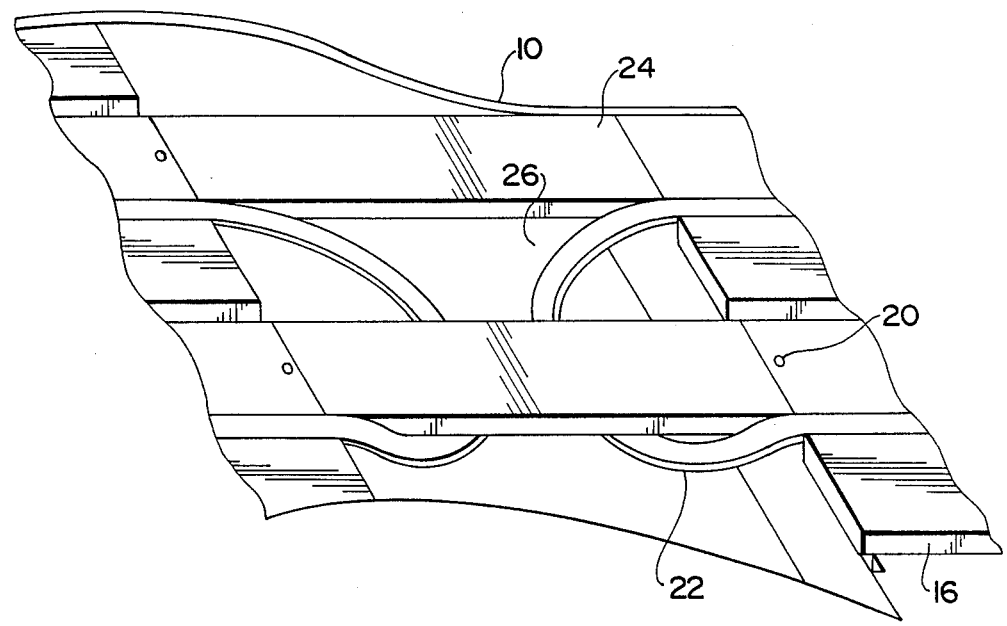
FIG. 4 is a partially schematic cutaway isometric view of the floor construction according to the present invention at a zone joint.

As shown in FIGS. 2 and 3, the tubing 18 forms U-bends or connections with manifolds in a plurality of cavities between the floor joists 30 and 32, the cavities between the floor joists 30 being designated herein as intermediate cavities 26, and the cavities between a floor joist 30 and a perimeter joist 32 being designated as perimeter cavities 34. Preferably, all manifolds are located at intermediate cavities 26, and U-bends typically at both intermediate cavities 26 and perimeter cavities 34. As shown in FIG. 4, support members 24, made of wood or the like, are located under the raised section of the metal deck 14 to span the perimeter cavities 34 over to the perimeter joist 32. The support members 24 are also located between intermediate joists 30 (see FIGS. 3 and 4), over the U-bends or manifolds.

In an embodiment where additional mass is desirable for acoustical, structural or energy storage reasons, a thin formed-in-situ topping, such as concrete, may be applied over the metal deck. In this embodiment, the areas above the U-bends or manifolds are also covered with the metal deck to protect the tubing 18 and support the concrete topping.

In accordance with the present invention, an hydronic radiant floor system may be constructed for "raised-floor" construction, wherein the need for pouring concrete surrounding the tubing is eliminated.

Figure 5A:
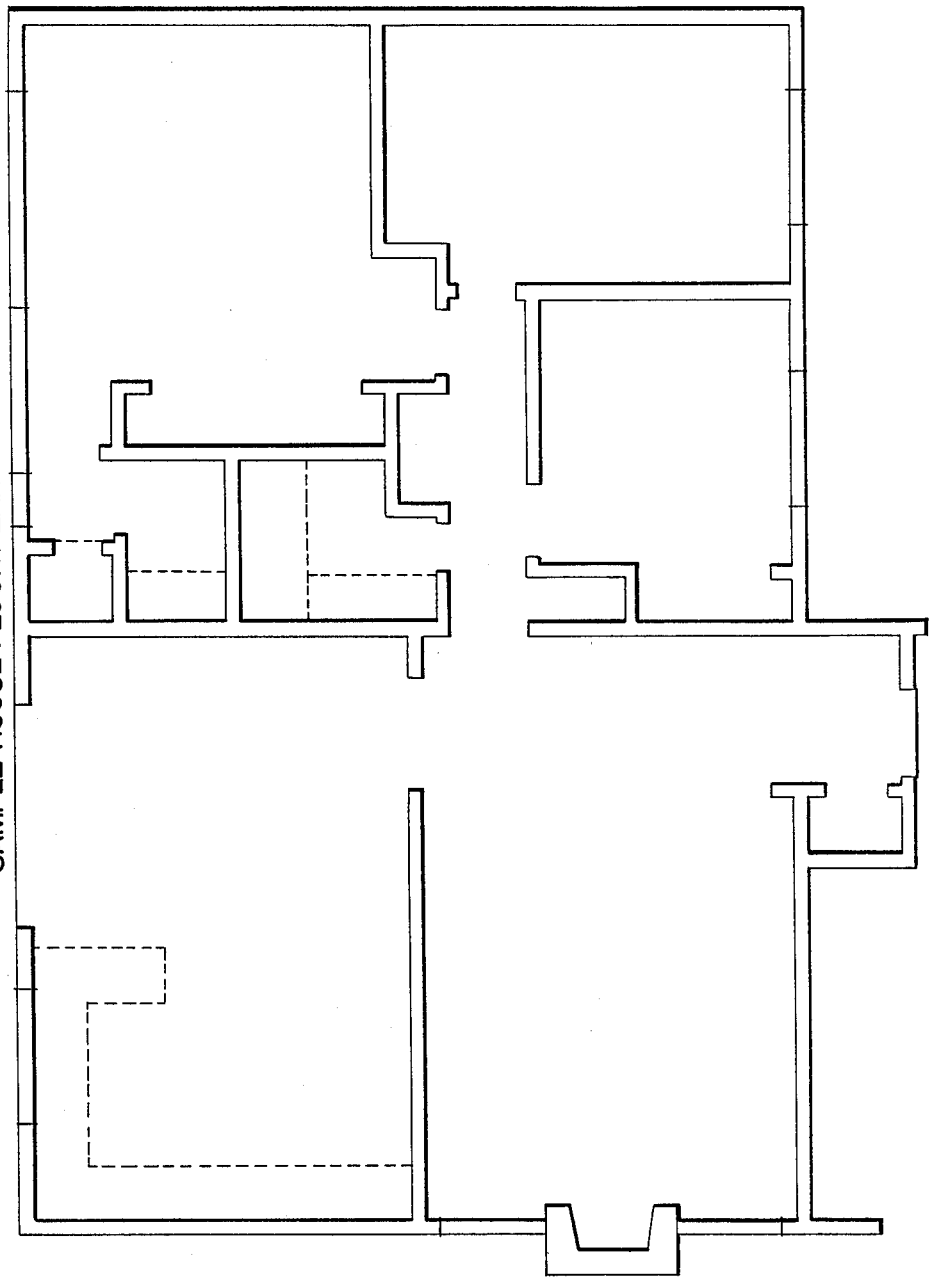
FIG. 5A is a floor plan of a typical one story house.
Figure 5B:
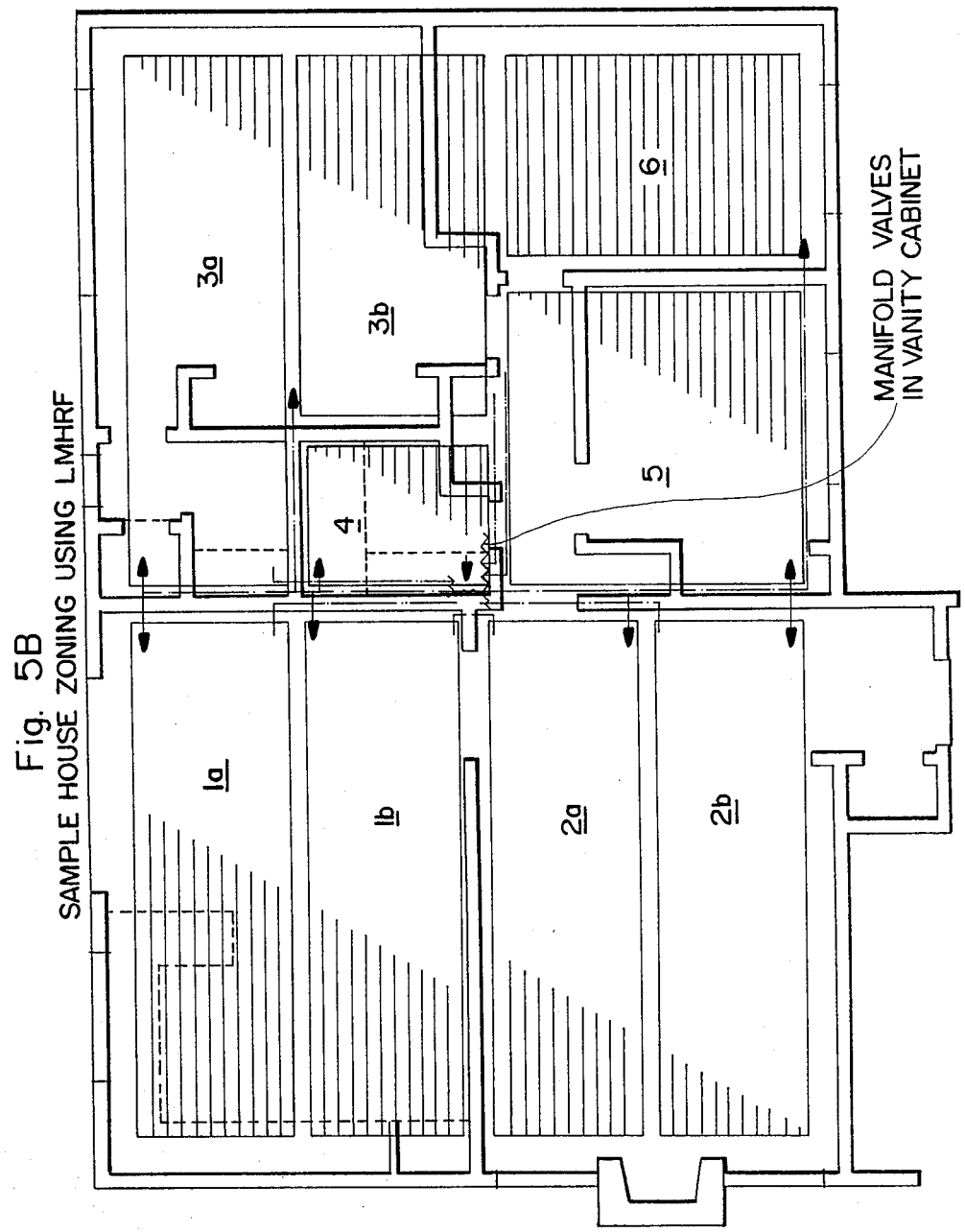
FIG. 5B is the zoning pattern for the home disclosed in FIG. 5A.

One important advantage of the invention LMHRF system is the ease of zoning. Room by room zoning with this system provides use of manifolds and U-bends as shown in FIGS. 3 and 4. FIG. 5A shows the floor plan of a typical one story home, and FIG. 5B suggests a zoning pattern for the home. All manifolds are located at the intermediate bays and U-bends at the exterior perimeter. Zone adjustments may be made in a central location. The heat source need not be at the zone adjustment location, which may be one of a variety of distribution box devices. Additionally, overall building temperature control systems, typically thermostatically controlled systems, may be used with the inventive floor structure. A serpentine pattern is used within each zone; tube spacing in the zone may be varied for the desired distribution pattern and performance.

The system is further advantageous in that repairs may be made either from above by removing the flooring material, or from below by removing a portion of the deck.

Various modifications and alterations of the present invention will be readily apparent to persons skilled in the construction arts. It is intended, therefore, that the foregoing be considered as exemplary and that the scope of the invention be limited only by the following claims.

What is claimed is:

1. A low mass radiant floor heating system comprising:
    a metal deck for supporting flooring including a pluarlity of regularly spaced parallel troughs oriented perpendicular to parallel floor joists for supporting said deck, and a corresponding plurality of deck flat portions between said troughs, said troughs providing structural support to said deck for spanning across said floor joists;
    resilient tubing located in and held by at least some of said troughs for distributing heat by circulating warm liquid through said tubing, said deck flat portions adjacent the tubing in said troughs transferring heat laterally from said tubes held in said troughs;
    and wherein the size of said resilient tubing is slightly greater than the width of said troughs to contact sidewalls of said troughs to securely hold said resilient tubing in said troughs.

2. The low mass radiant floor heating system of claim 1 further comprising a floor material for covering said troughs and flat portions of said metal deck.

3. The low mass radiant floor heating system of claim 2, wherein said floor material is a planar floor material.

4. The low mass floor floor heating system of claim 3, wherein said planar floor material includes marks for locating floor fastener devices at locations which will avoid damage to said resilient tubing.

5. The low mass floor heating system of claim 2, wherein said floor material is a thin formed-in-situ topping.

6. The low mass floor heating system of claim 5, wherein said formed-in-situ topping is a thin layer of concrete.

7. The low mass radiant floor system of claim 1, wherein resilient tubing in adjacent troughs is interconnected to form a serpentine pattern.

8. The low mass radiant floor heating system of claim 7, wherein said resilient tubing in adjacent troughs is connected by U-bends and connections below a plane of said flat portions in cavities between said floor joists.

9. The low mass radiant floor heating system of claim 8, wherein said resilient is made of flexible plastic to form integral U-bends.

10. The low mass radiant floor heating system of claim 1, wherein troughs in which no resilient tubing is located are covered to provide a surface in the same plane as the plane of said flat portions between said troughs.

11. The floor heating system of claim 1 wherein the troughs have a rectangular cross-section.

12. A low mass radiant floor heating system for a structure comprising:
    a metal deck for supporting flooring including a plurality of regularly spaced parallel troughs oriented perpendicular to parallel spaced wooden floor joists for supporting said deck in a raised wood floor construction wherein said spaced wooden joists are each supported at spaced intervals by said structure, said metal deck further including a corresponding plurality of deck flat portions between said troughs, said troughs providing structural support to said deck for spanning across said wooden floor joists;
    resilient tubing located in and held by at least some of said troughs for distributing heat by circulating warm liquid through said tubing, said deck flat portions adjacent the tubing in said troughs transferring heat laterally from said tubes held in said troughs;
    and wherein the size of said resilient tubing is slightly greater than the width of said troughs to contact sidewalls of said troughs to securely hold said resilient tubing in said troughs.

* * * * *